(12) United States Patent
Lee et al.

(10) Patent No.: US 12,490,813 B2
(45) Date of Patent: Dec. 9, 2025

(54) DEVICE FOR MEASURING INNER SIZE OF SHOE

(71) Applicant: PERFITT, INC., Daejeon (KR)

(72) Inventors: Steena Sun Yong Lee, Seoul (KR); Ye Ji Choi, Gwangju-si (KR)

(73) Assignee: PERFITT, INC., Yuseong-gu (KR)

( * ) Notice: Subject to any disclaimer, the term of this patent is extended or adjusted under 35 U.S.C. 154(b) by 74 days.

(21) Appl. No.: 18/241,171

(22) Filed: Aug. 31, 2023

(65) Prior Publication Data

US 2023/0404217 A1    Dec. 21, 2023

Related U.S. Application Data

(62) Division of application No. 16/979,109, filed as application No. PCT/KR2019/002800 on Mar. 11, 2019, now Pat. No. 11,779,085.

(30) Foreign Application Priority Data

Mar. 9, 2018   (KR) ........................ 10-2018-0028312

(51) Int. Cl.
*A43D 1/06*      (2006.01)
*G01B 11/24*    (2006.01)

(52) U.S. Cl.
CPC ............... *A43D 1/06* (2013.01); *G01B 11/24* (2013.01)

(58) Field of Classification Search
CPC . A43D 1/06; A43D 1/025; A43D 1/08; G01B 11/24; G01B 11/12; G01B 11/245; G01B 5/0004; G01B 5/207; B32B 17/10; B32B 2307/4023; B32B 27/08; B32B 37/12; B32B 7/12; B32B 38/0004; C03B 33/033; C03B 33/037; C03B 33/074; C03C 17/324; C03C 17/326; C03C 21/002
See application file for complete search history.

(56) References Cited

U.S. PATENT DOCUMENTS

| 6,192,593 | B1 * | 2/2001 | Borchers ................. A43D 1/06 33/542.1 |
| 7,343,691 | B2 | 3/2008 | Long et al. |
| 2012/0316827 | A1 | 12/2012 | Wilkinson et al. |

(Continued)

FOREIGN PATENT DOCUMENTS

| FR | 3002119 A1 * | 8/2014 | ............. A43D 1/025 |
| KR | 200223530 | 5/2001 | |
| KR | 200374695 | 2/2005 | |

OTHER PUBLICATIONS

Restriction Requirement dated May 24, 2022, issued in the U.S. Appl. No. 16/979,109.

(Continued)

*Primary Examiner* — Tri T Ton
(74) *Attorney, Agent, or Firm* — PnK IP LLC

(57) ABSTRACT

A device for measuring an inner size of a shoe, the device includes: a driving unit inserted into the shoe; a length adjustment unit having a length capable of being adjusted by the driving unit and having a shape of a stick that is elongated in front and rear directions of the shoe; and a measuring unit capable of moving along the length adjustment unit in the front and rear directions of the shoe and having a sensor for measuring a distance up to an inner surface of the shoe.

13 Claims, 20 Drawing Sheets

(56) References Cited

U.S. PATENT DOCUMENTS

2018/0149460 A1   5/2018  McGuire et al.
2021/0093051 A1   4/2021  Lee et al.

OTHER PUBLICATIONS

Non-final Office Action dated Sep. 21, 2022, issued in the U.S. Appl. No. 16/979,109.
Final Office Action dated Jan. 10, 2023, issued in the U.S. Appl. No. 16/979,109.
Notice of Allowance dated Jun. 1, 2023, issued in the U.S. Patent Application No. 16/979, 109.
International Search Report dated Jun. 12, 2019, issued in International Application No. PCT/KR2019/002800.

* cited by examiner

DEVICE FOR MEASURING INNER SIZE OF SHOE

CROSS REFERENCE TO RELATED APPLICATIONS

This application is a Divisional Application of U.S. patent application Ser. No. 16/979,109, filed on Sep. 8, 2020, which is a National Stage Entry of International Patent Application No. PCT/KR2019/002800, filed on Mar. 11, 2019, which claims priority from and the benefit of Korean Patent Application No. 10-2018-0028312, filed on Mar. 9, 2018, each of which is hereby incorporated by reference for all purposes as if fully set forth herein.

BACKGROUND

Field

Embodiments of the invention relate generally to a device for measuring the inner structure and the inner size of a shoe.

Discussion of the Background

In most shoe manufacturing industries, shoes are manufactured by classifying only the size of the foot at 5 mm intervals without classifying the shape of the foot. There is no standardized dimension standard for each company, and even with shoes of the same size, shoes of different brands sometimes do not fit the feet. In the case of wearing shoes that do not fit the feet like this, symptoms of foot deformation such as hallux valgus may occur due to continuous compression of the shoes, and such deformation of the feet may damage the overall health of the body.

Recently, in order to prevent this risk, the technology in which the shape of a user's foot is three-dimensionally (3D) scanned to manufacture shoes considering several requirements such as the size of the user's foot, the arch, the width of feet, the toe length and the height of the instep of the foot so as to produce shoes that fit exactly to the user's foot, has been developed and used.

The above information disclosed in this Background section is only for understanding of the background of the inventive concepts, and, therefore, it may contain information that does not constitute prior art.

SUMMARY

Device for measuring an inner size of a shoe constructed according to illustrative implementations of the invention are capable of automatically acquiring three-dimensional (3D) structure information of the inner surface of the shoe or important dimension information of the shoe such as 'length,' 'the width of feet,' and 'the height of the instep of the foot' by measuring the inner size of a shoe.

In particular, since the device of the present disclosure can accurately and quickly acquire dimension information of the 'inner surface' rather than the 'outer surface' of the shoe, it can be usefully used to find customized shoes that fit the shape of a user's foot. According to an aspect of the present disclosure, a device for measuring the inner size of a shoe, includes a measuring unit including a sensor inserted into the shoe to measure a distance up to an inner surface of the shoe, a driving unit capable of rotating the measuring unit around a preset rotation axis, and a frame for supporting the driving unit.

The measuring unit may include a plurality of sensors, and the plurality of sensors may be arranged at different heights of the measuring unit.

The measuring unit may include a plurality of sensors, and the plurality of sensors may be arranged at the same height of the measuring unit.

Sensing ranges of the plurality of sensors may be different from each other.

The driving unit may move the measuring unit in a direction parallel to the rotation axis.

The device may further include a control unit configured to control the driving unit and to calculate a three-dimensional structure of an inner surface of the shoe through data acquired from the measuring unit.

According to another aspect of the present disclosure, a device for measuring the inner size of a shoe, includes a driving unit inserted into the shoe, a length adjustment unit having a length capable of being adjusted by the driving unit and having a shape of a stick that is elongated in front and rear directions of the shoe, and a measuring unit capable of moving along the length adjustment unit in the front and rear direction of the shoe and having a sensor for measuring a distance up to an inner surface of the shoe.

The device may further include a contact sensor installed at a front end of the length adjustment unit.

According to another aspect of the present disclosure, a device for measuring the inner size of a shoe, includes a rotation unit capable of rotating the shoe around a preset rotation axis, a measuring unit including a sensor inserted into the shoe to measure a distance up to an inner surface of the shoe, and a frame for supporting the rotation unit and connected to the measuring unit to fix a position of the measuring unit.

According to another aspect of the invention, a device for measuring an inner size of a shoe, the device includes: a driving unit inserted into the shoe; a length adjustment unit having a length capable of being adjusted by the driving unit and having a shape of a stick that is elongated in front and rear directions of the shoe; and a measuring unit capable of moving along the length adjustment unit in the front and rear directions of the shoe and having a sensor for measuring a distance up to an inner surface of the shoe.

The device may further include a contact sensor installed at a front end of the length adjustment unit.

The device may further include a control unit configured to control the length adjustment unit and to calculate a length of the shoe in the front and rear directions.

The control unit may be configured to determine that the length adjustment unit comes in contact with the inner surface of the front of the shoe and calculate the length of the shoe in the front and rear directions by receiving length information at a point in time at which the length adjustment unit stops.

The driving unit may be configured to be inserted into a back of the inside of the shoe.

The sensor may include a first sensor being capable of measuring the distance up to an inner surface of the shoe in a non-contact manner.

The length adjustment unit may include: a fixing shaft elongated from the driving unit; and a movement unit coupled to the fixing shaft and being configured to be moved.

The contact sensor may be installed at the moving unit.

According to still another aspect of the invention, a device for measuring an inner size of a shoe, the device includes: a driving unit inserted into the shoe; a length adjustment unit having a length capable of being adjusted by the driving unit and being elongated in front and rear directions of the shoe; a measuring unit having a sensor for measuring a distance up to an inner surface of the shoe; and a control unit configured to control the length adjustment unit and to calculate a length of the shoe in the front and rear directions.

The sensor may include a contact sensor installed at a front end of the length adjustment unit.

The control unit may be configured to determine that the length adjustment unit comes in contact with the inner surface of the front of the shoe and calculate the length of the shoe in the front and rear directions by receiving length information at a point in time at which the length adjustment unit stops.

The driving unit may be configured to be inserted into a back of the inside of the shoe.

The sensor may include a first sensor being capable of measuring the distance up to an inner surface of the shoe in a non-contact manner.

The length adjustment unit may include: a fixing shaft elongated from the driving unit; and a movement unit coupled to the fixing shaft and being configured to be moved.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
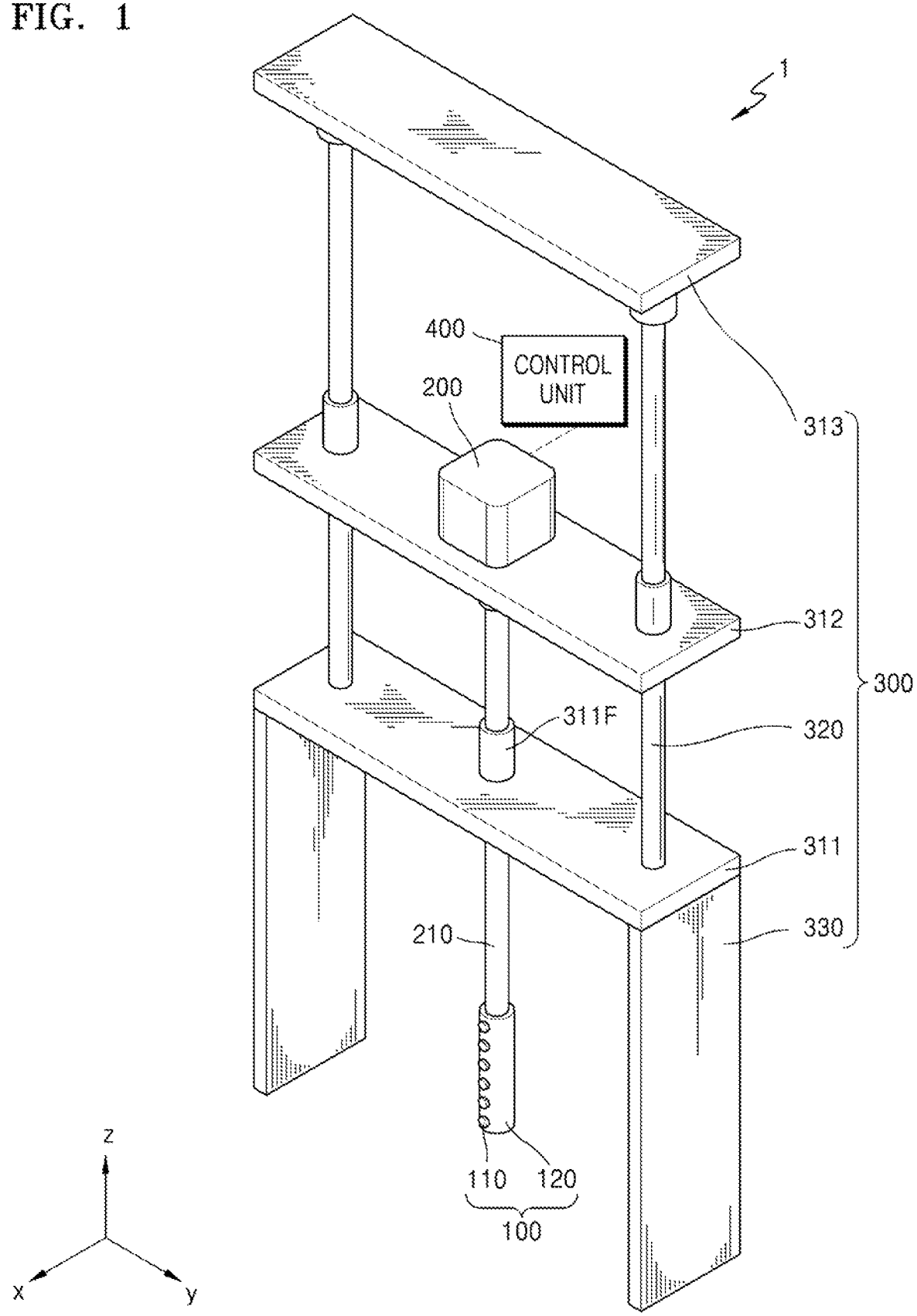
FIG. 1 is a perspective view schematically illustrating a device for measuring the inner size of a shoe according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Sizes of elements in the drawings may be exaggerated for convenience of explanation. In other words, since sizes and thicknesses of components in the drawings are arbitrarily illustrated for convenience of explanation, the following embodiments are not limited thereto.

In the present specification, expressions such as 'front' and 'rear' may be based on the x-axis shown in the drawing, and expressions such as 'left' and 'right' may be based on the y-axis shown in the drawing, and expressions such as 'up' and 'down' may be based on the z-axis shown in the drawing.

FIG. 1 is a perspective view schematically illustrating a device 1 for measuring the inner size of a shoe according to an embodiment of the present disclosure. The device 1 for measuring the inner size of a shoe according to an embodiment may include a measuring unit 100, a driving unit 200, and a frame 300.

The measuring unit 100 may include a sensor 110, and a substrate 120 to which the sensor 110 is connected. The measuring unit 100 may be inserted into the shoe. The substrate 120 may have a pillar shape, for example. The width of the substrate 120 in the z-direction may be about 5 cm to about 30 cm to be suitable for the height of a typical shoe, however, embodiments are not limited thereto.

The sensor 110 may be exposed to the outside of the substrate 120. The sensor 110 may be inserted into the shoe together with the substrate 120 to measure a distance up to a shoe inner surface S_IS. More specifically, the sensor 110 may measure a distance up to a specific point of the shoe inner surface S_IS. The sensor 110 may be a sensor for measuring a distance up to an object by using triangulation or a sensor for measuring a distance up to the object through time of flight of a signal. The sensor 110 may be, for example, a laser sensor, an infrared sensor, an ultrasonic sensor, but embodiments are not limited thereto.

The driving unit 200 may rotate the measuring unit 100 around a rotation axis. The driving unit 200 and the measuring unit 100 may be connected to each other via a connection portion 210. The driving unit 200 may include a rotation motor. The driving unit 200 may be, for example, a stepper motor or servo motor. By rotation of the motor of the driving unit 200, the connection portion 210 and the measuring unit 100 may rotate using the z-axis as a rotation axis.

The frame 300 may support the driving unit 200. Two support portions 330 at the bottom of the frame 300 may fix the entire device 1 for measuring the inner size of the shoe to the ground. The connection portion 210 and the measuring unit 100 may be located between the two support portions 330. A first stage 311 may be placed on the support portions 330. The center of the first stage 311 may be penetrated by the connection portion 210. The first stage 311 may include a fixing portion 311F that holds the connection portion 210 to be rotated so that the central axis of the connection portion 210 may not be shaken. A second stage 312 may be placed on the first stage 311. The second stage 312 may be supported by a support pillar 320. The driving unit 200 may be placed on the second stage 312. The second stage 312 may reciprocate in the z-direction along the support pillar 320 through a user's attraction or a mechanical/electrical mechanism. The height of the driving unit 200 and the measuring unit 100 in the z-direction may be adjusted by the movement of the second stage 312. The third stage 313 may cover a top surface of the support pillar 320 that penetrates the second stage 312. The three-stage structure of the frame 300 described above is merely exemplary, and the structure of the frame 300 of the present disclosure is not limited thereto.

A control unit 400 may transmit/receive a signal to/from the driving unit 200 and the measuring unit 100 in a wired/wireless manner. The control unit 400 may control on/off and operations of the driving unit 200 and the sensor 110. The control unit 400 may process the signal received by the measuring unit 100 to calculate various data such as a shoe size, which will be described later in the description related to FIG. 13.

Figure 2:
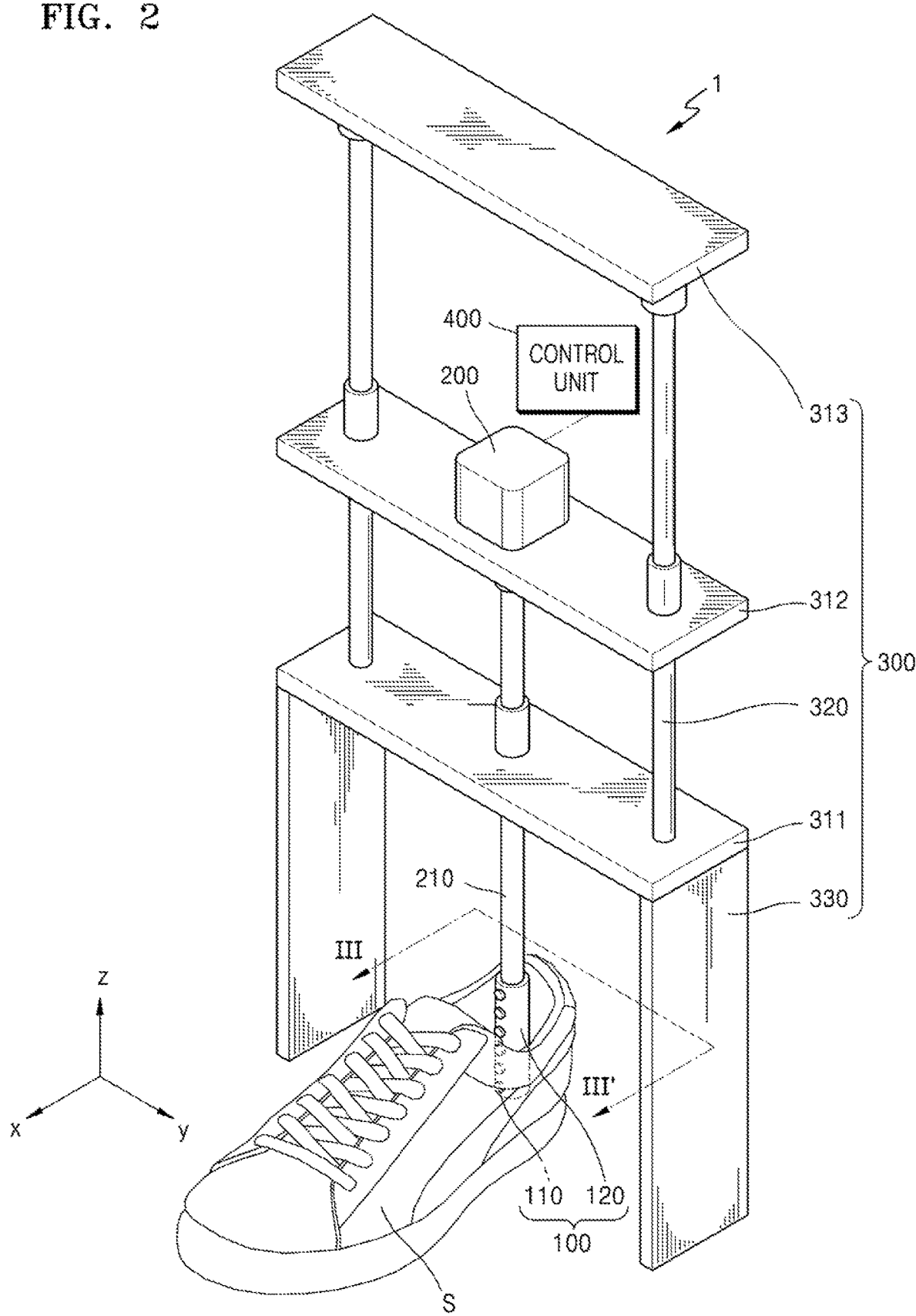
FIG. 2 is a perspective view illustrating a state in which a measuring unit of the device for measuring the inner size of a shoe is inserted into the shoe.

FIG. 2 is a perspective view illustrating a state in which the measuring unit 100 of the device 1 for measuring the inner size of a shoe is inserted into a shoe S. The user may raise the second stage 312 on which the measuring unit 100 is placed, and may position the connection portion 210 and the measuring unit 100 high for a while. Alternatively, when the length of the connection portion 210 is capable of being adjusted, the user may shorten the length of the connection portion 210 by operating the driving unit 200 to position the measuring unit 100 temporarily high. When the height of the measuring unit 100 is increased, the user may place the shoe S in an appropriate position between the support portions 330. Subsequently, the user may lower the second stage 312 again or increase the length of the connection portion 210 again to lower the height of the measuring unit 100. Thus, the measuring unit 100 may be inserted into the shoe S. The user may complete preparation for measurement of the inner size of the shoe S by properly adjusting the position of the shoe S, so that, even when the measuring unit 100 is rotated inside the shoe S, the measuring unit 100 does not come in contact with the shoe S.

Figure 3:
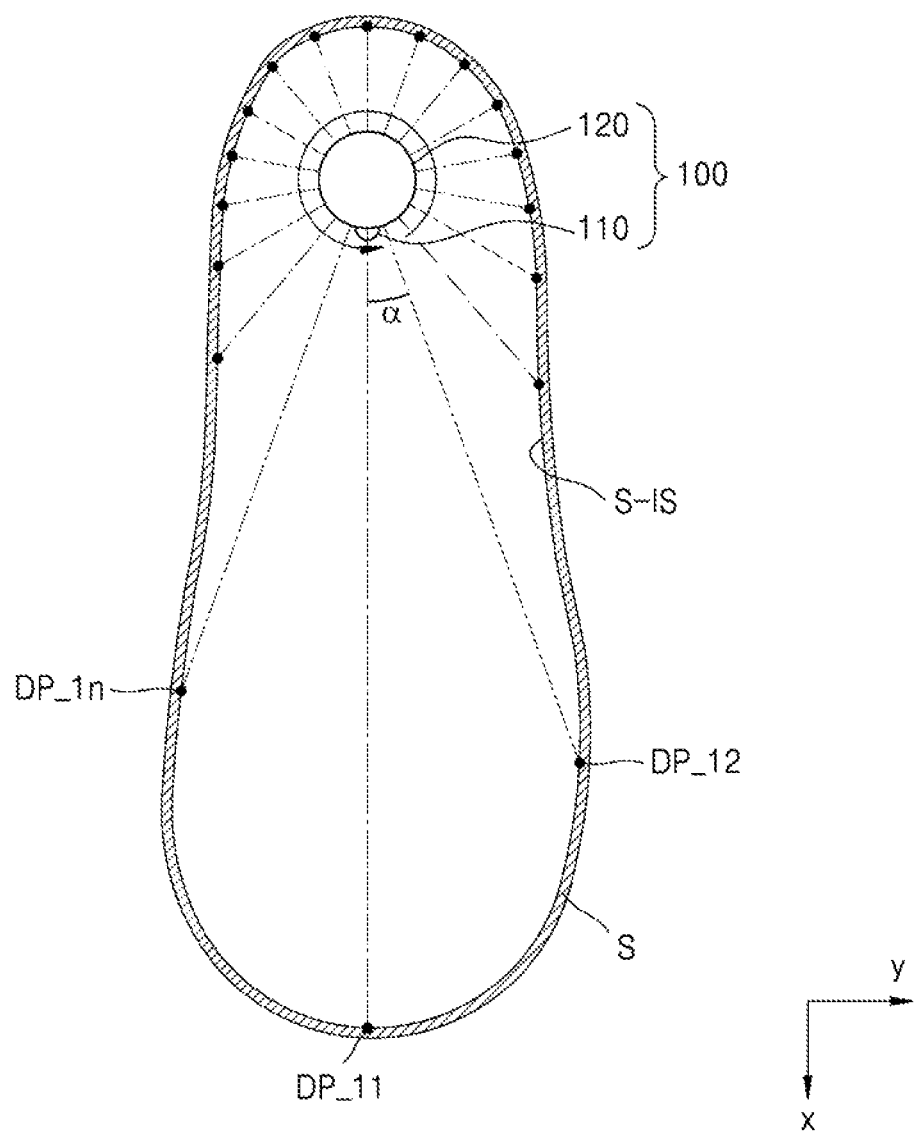
FIG. 3 is a cross-sectional view of the measuring unit of FIG. 2 and the shoe taken along line III-III'.

FIG. 3 is a cross-sectional view of the measuring unit 100 of FIG. 2 and the shoe taken along line III-III'. Referring to FIG. 3, after the measuring unit 100 is inserted into a rear portion of the shoe S, the measuring unit 100 may be rotated within the shoe S by the driving unit 200. The measuring unit 100 may be rotated about 360 degrees. The sensor 110 may measure a distance up to the shoe inner surface S_IS discretely while rotating. For example, when the control unit 400 transmits a measurement start signal, the sensor 110 may measure the distance up to a first data point DP_11 where an extension line in a sensing direction and the shoe inner surface S_IS meet. Thereafter, when the measuring unit 100 is rotated at a preset angle, the sensor 110 may measure a distance up to a second data point DP_12 where the extension line in the sensing direction and the shoe inner surface S_IS meet. The rotation and sensing process of the measuring unit 100 may be repeatedly performed until the sensor 110 rotates at 360 degrees and measures a distance up to an n-th data point DP_1n. Thus, contour data of the shoe inner surface S_IS at a height at which the sensor 110 is placed, may be 'flatly' acquired. Hereinafter, a plane of the height at which the sensor 110 is placed, will be referred to as a layer, and measuring a distance up to a specific data point by using the sensor 110 will be expressed as 'acquiring' a data point.

The sensor 110 may repeatedly perform a process of acquiring a data point and then rotating at a certain angle α and then acquiring a data point. At this time, the certain angle α may be controlled by the control unit 400. For example, in an embodiment in which the measuring unit 100 is rotated using the driving unit 200 including a stepper motor, the measuring unit 100 may be rotated by 0.18 degrees per each 'step'. In this case, when the measuring unit 100 may be rotated once, the sensor 110 may acquire 2000 data points (360 degrees/0.18 degrees=2000) data points. Embodiments are not limited thereto, and the rotation angle α per each 'step' may be variously set to about 0.05 degrees to about 10 degrees. When the rotation angle α per each 'step' is small, the contour data of the shoe inner surface S_IS of a layer on which the sensor 110 is placed, becomes substantially close to a continuous line.

In addition, the measuring unit 100 may be rotated once or more to acquire data points. The control unit 400 may calculate a value obtained by 'averaging' distances measured whenever the sensor 110 of the measuring unit 100 rotates, as a final measurement distance.

Figure 4:
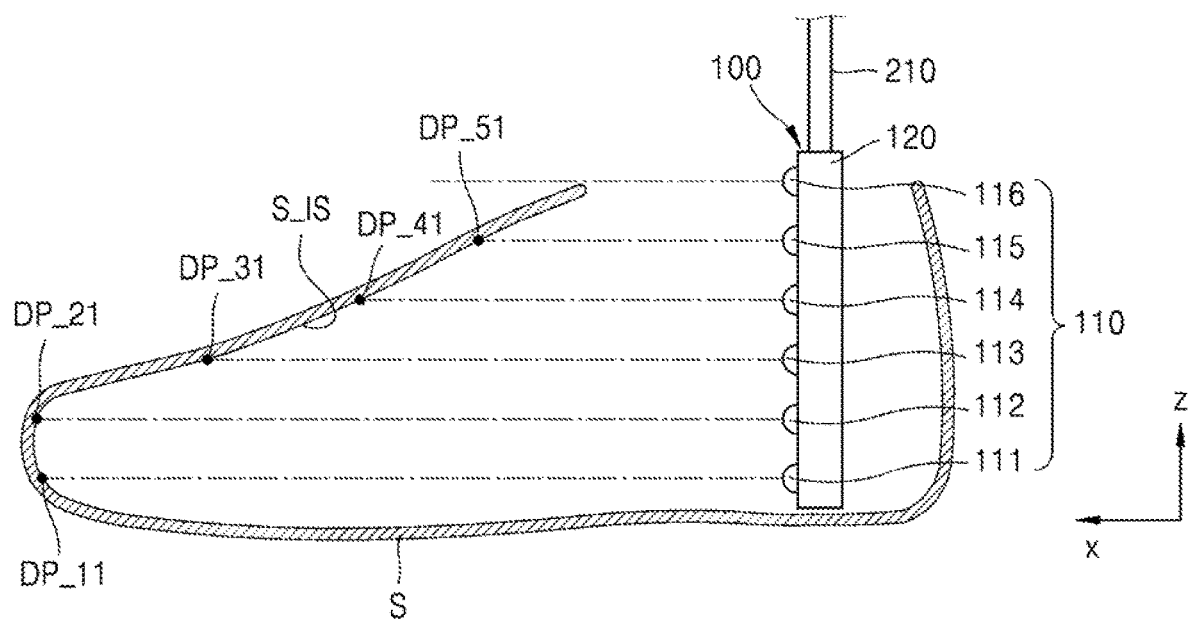
FIGS. 4 and 5 are diagrams conceptually illustrating a method of measuring the inner size of a shoe by using a measuring unit having a plurality of sensors arranged at different heights.
Figure 5:
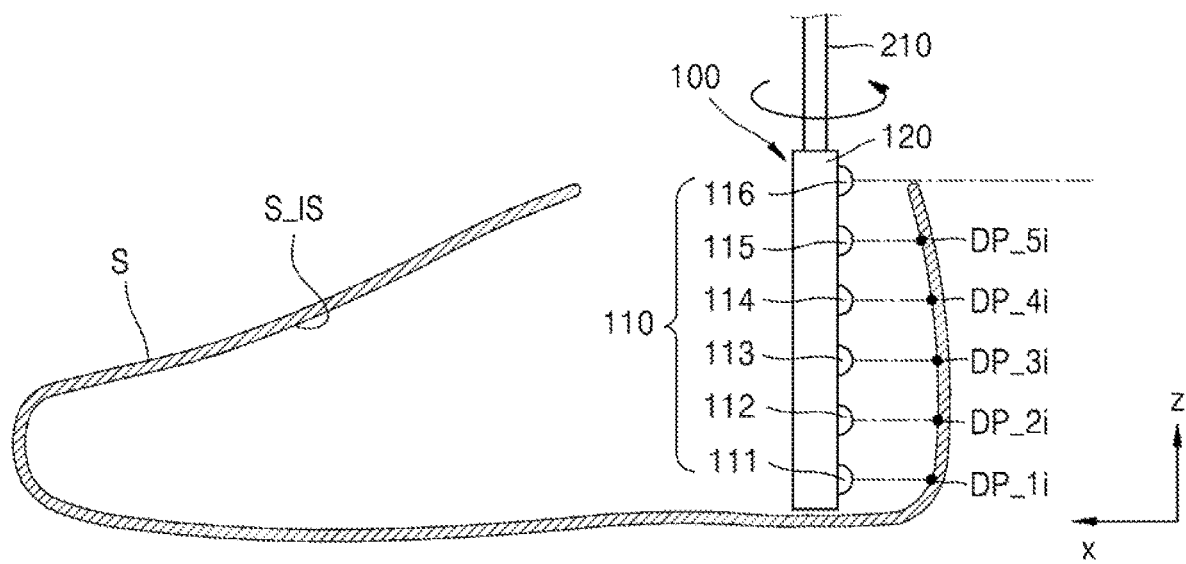

FIGS. 4 and 5 are diagrams conceptually illustrating a method of measuring the inner size of a shoe by using a measuring unit 100 having a plurality of sensors 110 arranged at different heights.

According to an embodiment, the measuring unit 100 may include a plurality of sensors 110, and the plurality of sensors 110 may be arranged at different heights of the measuring unit 100. Referring to FIGS. 4 and 5, the plurality of sensors 110 may be arranged in parallel along the z-axis. The sensor 110 may be arranged at regular intervals. FIGS. 4 and 5 illustrate that six sensors 111, 112, 113, 114, 115, and 116 are arranged. However, embodiments are not limited thereto. Since each sensor 110 calculates contour data of the corresponding layer, when the plurality of sensors 110 having different heights are used, contour data of a plurality of layers may be calculated at once.

A height difference between the uppermost sensor and the lowermost sensor among the plurality of sensors 110 may be about 5 cm to about 30 cm. Each sensor 110 may be arranged at regular intervals. Some of the plurality of sensors 110 may be positioned higher than the top end of the shoe S depending on the height of the shoe S to be measured. FIGS. 4 and 5 illustrate that the uppermost sensor 116 is positioned higher than the top end of the shoe S.

The plurality of sensors 110 may measure distances from different layers up to the shoe inner surface S_IS. Referring to FIG. 4, the sensor 110 that receives a command of the control unit 100 to start measurement may measure a distance up to the shoe front inner surface S_IS. For example, the first sensor 111 may measure a distance up to a first data point DP_11 of a first layer. The second sensor 112 may measure a distance up to a first data point DP_21 of a second layer. That is, for each sensor 110, a distance up to each of first data points DP_11, DP_21, DP_31, DP_41, and DP_51 of each layer may be measured.

Thereafter, when the measuring unit 100 is rotated, each sensor 110 may acquire a data point from a layer in which it is positioned, as shown in FIG. 3. Referring to FIG. 5, for example, in a state in which the measuring unit 100 is rotated at about 180 degrees, each sensor 110 may measure a distance up to the rear of the shoe S. A first sensor 111 may measure a distance up to an i-th data point DP_1i of the first layer. A second sensor 112 may measure a distance up to an i-th data point DP_2i of the second layer. That is, for each sensor 110, a distance up to each of i-th data points DP_1i, DP_2i, DP_3i, DP_4i, and DP_5i of each layer may be measured.

In addition, when some of the sensors 110 are positioned higher than the top end of the shoe, a distance may not be measured (INF), or a distance up to another object located outside the shoe may be measured unintentionally. In this case, the control unit 400 may ignore data obtained from the sensor 110. For example, when a distance up to a specific data point is 40 cm or more, the control unit 400 may determine that the data point is located at another object outside the shoe (not the shoe inner surface S_IS) and may not include the data point in the contour data of the shoe inner surface S_IS. FIGS. 4 and 5 illustrate that the uppermost sensor 116 does not acquire any data point.

When rotation of the measuring unit 100 is completed, contour data of the shoe inner surface S_IS in which each sensor 110 is located, may be acquired. In this case, when the plurality of sensors 110 are respectively arranged at different heights, the measuring unit 100 may be rotated once to acquire "stereoscopically" the contour data of the shoe inner surface S_IS. This will be described later in the description related to FIG. 13.

Figure 6:
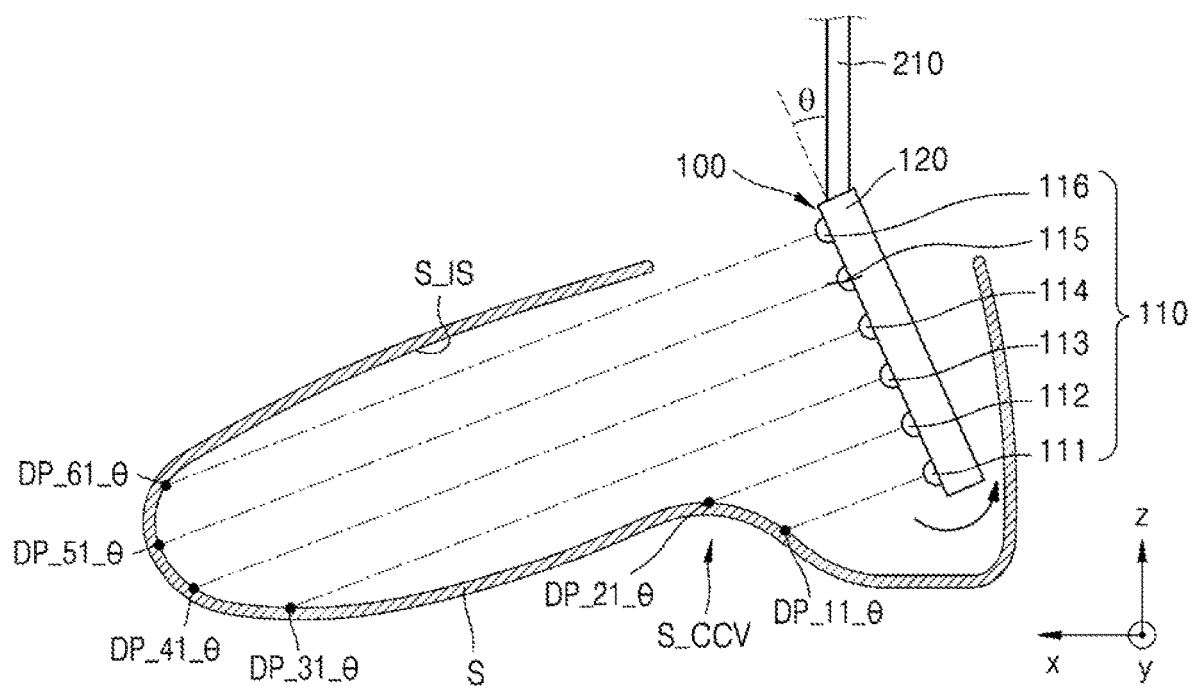
FIG. 6 is a diagram conceptually illustrating an operating method of a measuring unit according to an embodiment.

FIG. 6 is a diagram conceptually illustrating an operating method of the measuring unit 100 according to an embodiment.

Referring to FIG. 6, the shoe S having a concave portion S_CCV for supporting a concave part in the middle of the sole is shown. If the sensor 110 is located near the floor behind the shoe S, infrared rays, laser, and the like emitted from the sensor 110 may be reflected from the concave portion S_CCV. In this case, a data point in front of the shoe inner surface S_IS may not be acquired.

According to an embodiment, the measuring unit 100 may make a pitching motion with respect to the connection portion 210 of the driving unit 200. That is, the measuring unit 100 may be rotated in the front and rear directions of the shoe S with the y-axis of FIG. 6 as a central axis. The measuring unit 100 may be rotated around the z-axis by using the connection portion 210 and connected to the connection portion 210 so as to make a pitching motion with respect to the connection portion 210.

When the measuring unit 100 is inserted into the shoe S perpendicularly to the ground (not shown in FIG. 6), for example, when a signal of a distance that is less than or equal to a preset length (e.g., about 5 cm) is detected by the sensor 111 located at the bottom, the control unit 400 may determine that the field of view of the lower sensor 111 is 'covered' by the concave portion S_CCV. In this case, the control unit 400 may transmit a command to pitch the measuring unit 100 by a certain angle θ. When the sensor 110 is operated in a state in which the measuring unit 100 is pitched, the sensor located relatively above may acquire data points even in front of the shoe inner surface S_IS. For example, FIG. 6 illustrates that data points DP_41_θ, DP_51_θ, and DP_61_θ in front of the shoe S are acquired by the fourth sensor 114, the fifth sensor 115, and the sixth sensor 116. In addition, at this time, data points may also be acquired even from the bottom surface of the shoe inner surface S_IS. FIG. 6 illustrates that data points DP_11_θ, DP_21_θ, and DP_31_θ around the concave portion S_CCV are acquired by the first sensor 111, the second sensor 112, and the third sensor 113. That is, when the measuring unit 100 makes a pitching motion, even the shoe S having the concave portion S_CCV may acquire data points on the entire shoe inner surface S_IS including the front and bottom surfaces.

Figure 7:
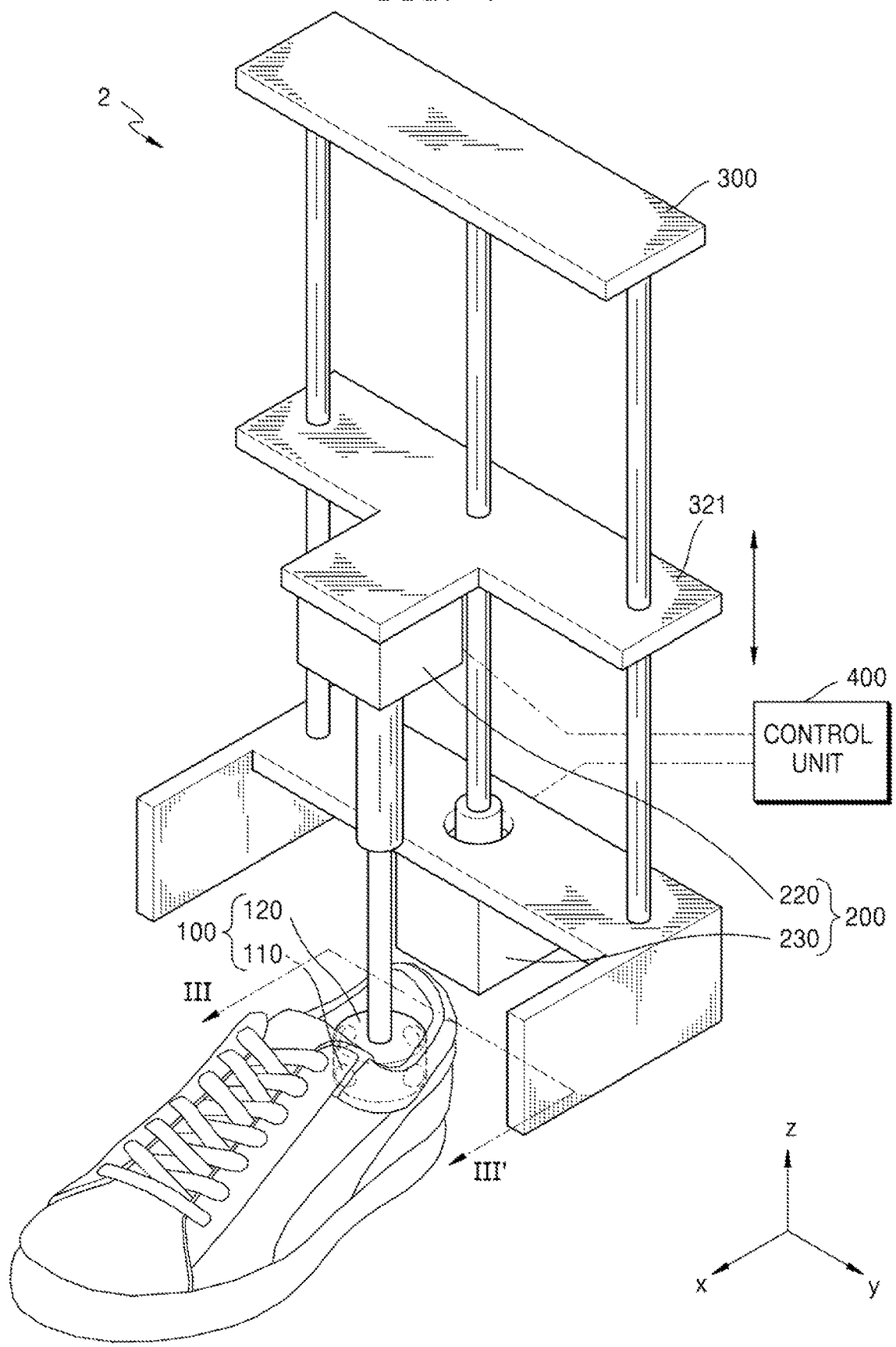
FIG. 7 is a perspective view schematically illustrating a device for measuring the inner size of a shoe according to another embodiment of the present disclosure.

FIG. 7 is a perspective view schematically illustrating a device for measuring the inner size of a shoe according to another embodiment of the present disclosure.

According to an embodiment, the measuring unit 100 may include a plurality of sensors 110, and the plurality of sensors 110 may be arranged at the same height of the measuring unit 100. An angle formed by each sensor 110 may be constant. FIG. 7 illustrates that four sensors 110 are connected to the substrate 120 at 90 degree intervals. Since all of the sensors 110 are arranged at the same height and at a certain angle, even if the measuring unit 100 is rotated by 90 degrees, data points may be acquired as a whole around the shoe inner surface S_IS at the corresponding height. However, in this case, since data points of a layer at a different height than the sensor 110 may not be acquired, a distance may be measured while changing the height of the measuring unit 100.

According to an embodiment, the driving unit 200 may move the measurement unit 100 in a direction parallel to the rotation axis (the z-axis of FIG. 7). For example, the driving unit 200 may include a rotation driving unit 220 capable of rotating the measuring unit 100, and a z-axis movement unit 230 capable of moving the measuring unit 100 in up and down directions. The z-axis movement unit 230 may move, for example, the second stage 312 in the up and down directions, thereby changing the height of the measuring unit 100. A method of controlling the height of the measuring unit 100 by using the driving unit 200 is not limited thereto.

Figure 8:
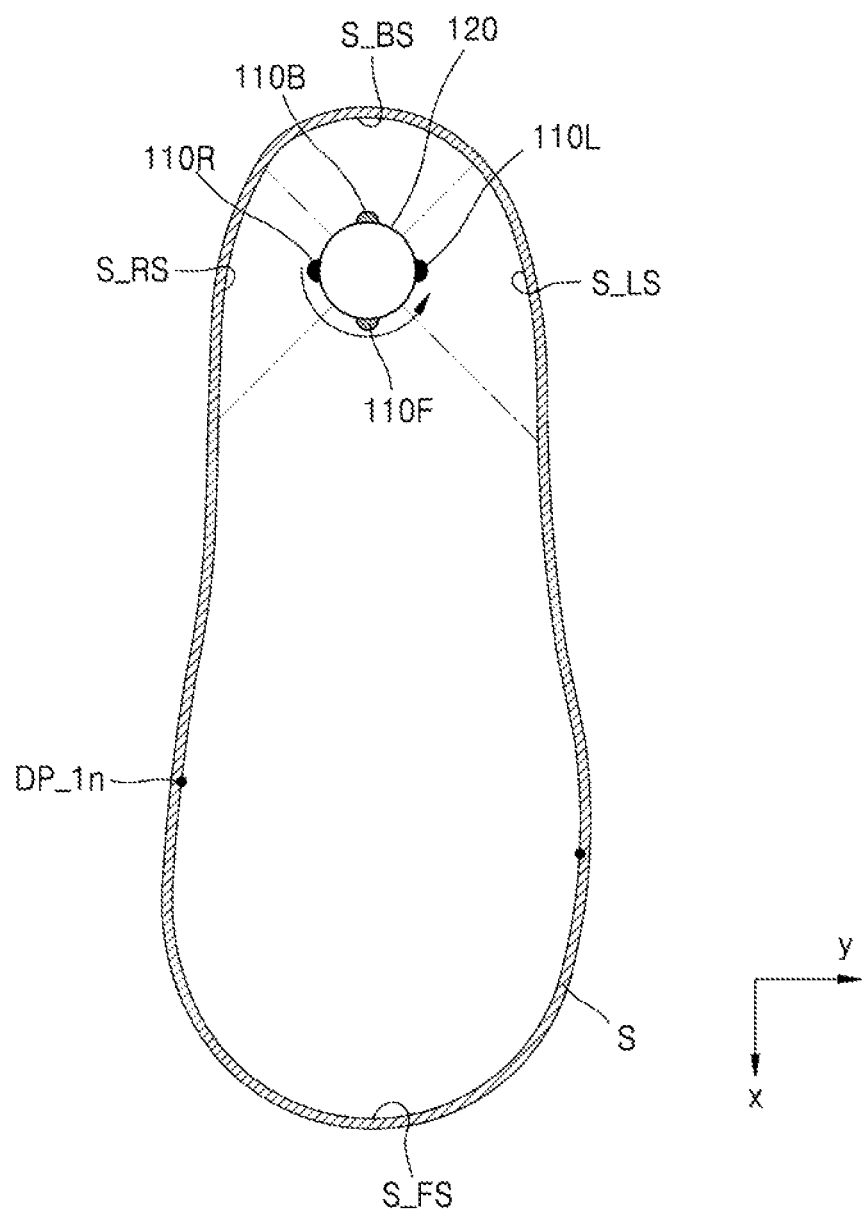
FIG. 8 is a cross-sectional view of a measuring unit of FIG. 7 and the shoe taken along line VIII-VIII'.

FIG. 8 is a cross-sectional view of the measuring unit 100 of FIG. 7 and the shoe S taken along line VIII-VIII'. The basic method of acquiring data points while the measuring unit 100 of FIG. 8 is rotated, is similar to that described in FIG. 3. Thus, differences from the above-described embodiment will be mainly described below.

The measuring unit 100 may have the sensors 110 at 90 degree intervals, for example, one at the front, rear, left, and right. For example, the front sensor 110F may acquire a data point in a region S_FS from −45 degrees to 45 degrees in front. The left sensor 110L may acquire a data point in a left region S_LS of the inner surface of the shoe. The rear sensor 110B may acquire a data point in a region S_BS from −45 degrees to 45 degrees in the rear. The right sensor 110R may acquire a data point in a right region S_RS of the inner surface of the shoe. The number, arrangement and angle of the above-described sensors 110 are exemplary and do not limit the present disclosure.

According to an embodiment, distance measurement ranges, i.e., sensing ranges of the plurality of sensors 110 may be different from each other. The distance measurement range refers to between an upper limit and a lower limit of a distance that may be measured by the sensor 110.

Due to the structure of the shoe S, the measuring unit 100 is inserted close to the rear of the shoe S, so that the sensing distance of the front sensor 110 is relatively long, while the sensing distance of the rear sensor 110 is relatively short. Thus, the sensing range of the front sensor 110F may be larger than the sensing range of the rear sensor 110B. That is, a sensor 110F capable of accurately sensing a distance to an object far away from a relatively far distance may be used in front of the measuring unit 100, and a sensor 110B capable of accurately sensing a distance to an object far away from a relatively far distance may be used at the rear of the measuring unit 100. For example, the sensing range of the front sensor 110F may be about 50 mm or more and about 400 mm or less, and the sensing range of the rear sensor 110B may be about 5 mm or more and about 50 mm or less. The above-described figures are exemplary and do not limit the present disclosure.

Different types of the sensors 110 may be selected to exhibit optimal performance at each position so that the measurement accuracy of the sensors 110 at each position may be enhanced.

Figure 9:
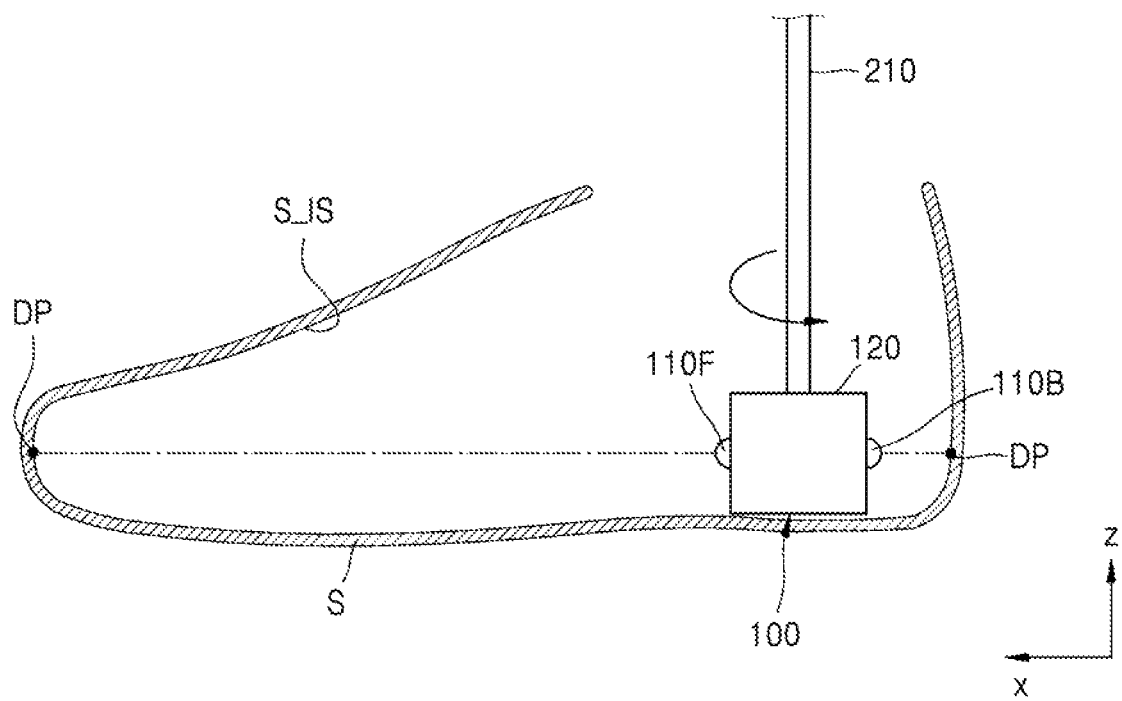
FIGS. 9 through 11 are diagrams conceptually illustrating a method of measuring the inner size of a shoe by using a measuring unit having a plurality of sensors arranged at the same height.
Figure 10:
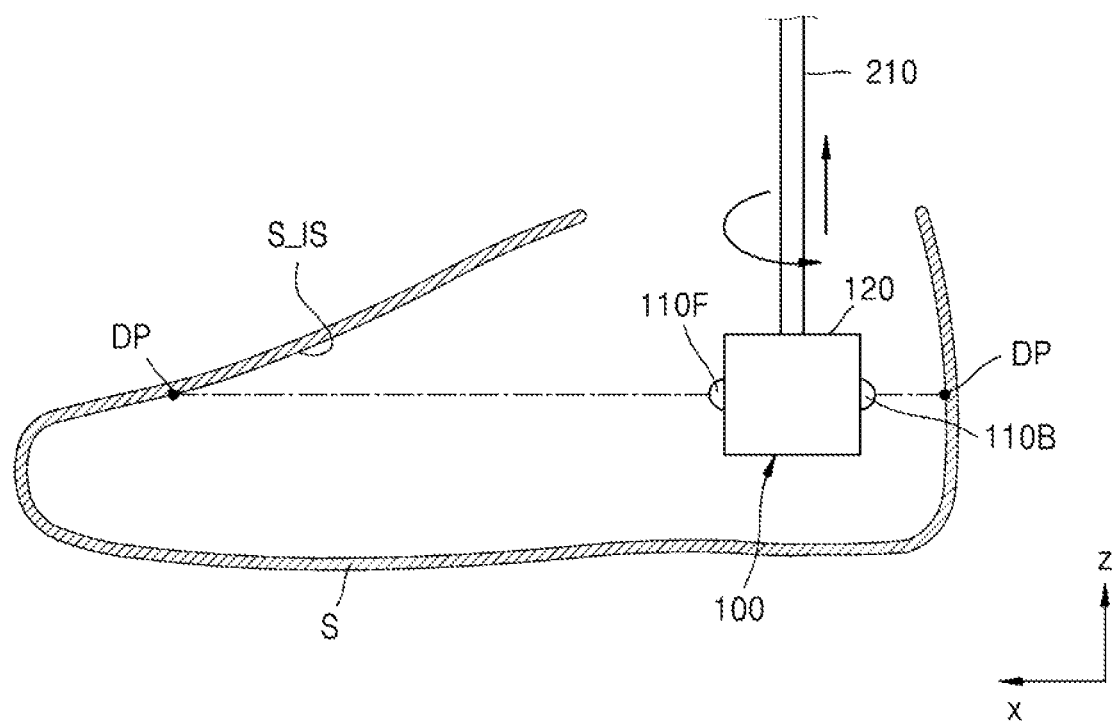
Figure 11:
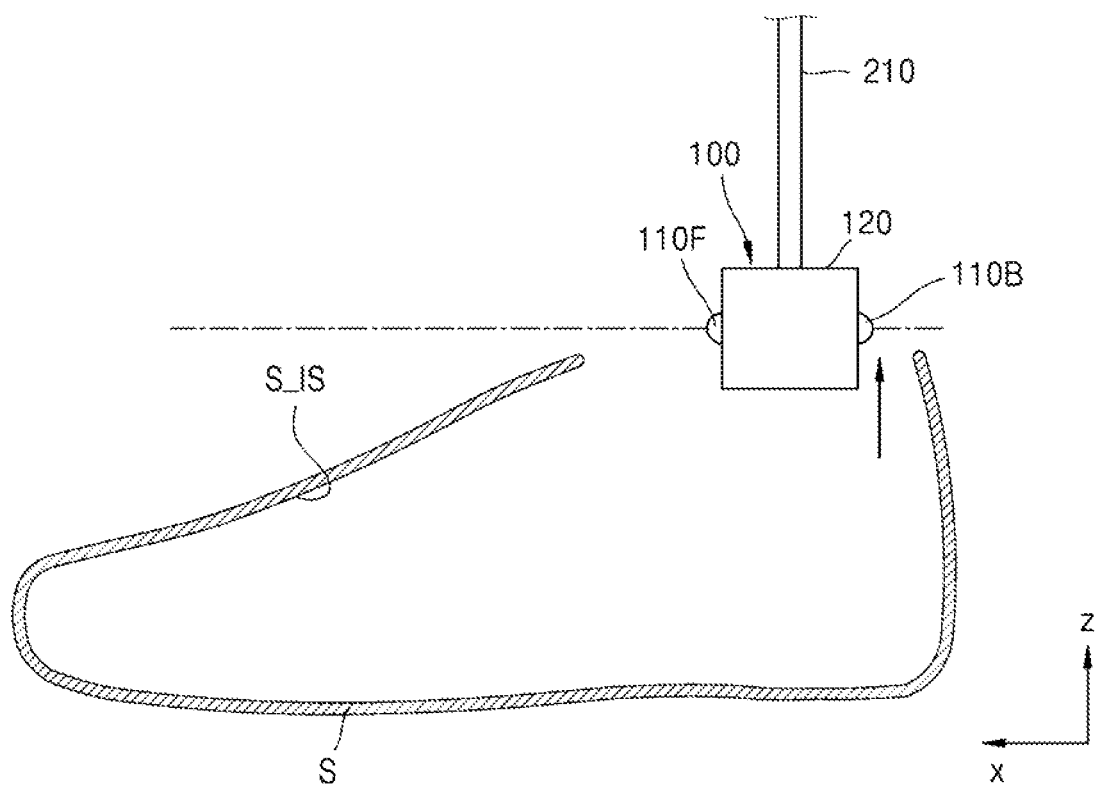

FIGS. 9 through 11 are diagrams conceptually illustrating a method of measuring the inner size of the shoe S by using the measuring unit 100 having the plurality of sensors 110 arranged at the same height. FIGS. 9 through 11 illustrate that the sensors 110F and 110B are arranged in front of and behind of the substrate 120, respectively, as an example.

Referring to FIG. 9, first, the measuring unit 100 may be adjusted in position to reach the floor of the shoe S. For example, the user may adjust the position of the measuring unit 100 so that the rear entrance of the shoe S is below the measuring unit 100, and then drive the z-axis movement unit 230 of the driving unit 200 to lower the measuring unit 100.

Thereafter, when a z-axis stopper (not shown) attached to the measuring unit 100 touches the floor of the shoe, the z-axis movement unit 230 may stop an operation. Optionally, the driving unit 200 may lift the measuring unit 100 at regular intervals immediately after the measuring unit 100 contacts the floor of the shoe to avoid friction with the bottom of the shoe.

Thereafter, the driving unit 200 may rotate the measuring unit 100 by using the rotation driving unit 220, and the sensor 110 may acquire a data point DP of the shoe inner surface S_IS while rotating. The total rotation angle of the measuring unit 100 may be changed according to the arrangement and number of the sensors 110. When the sensors 110F and 110B are arranged in front of and behind, respectively, as shown in FIG. 9, the measuring unit 100 may be rotated at 180 degrees or more to acquire the data point DP. When rotation of the measuring unit 100 is finished, acquiring of the data point DP at an initial height of the sensors 110 may be completed.

After acquiring of the data point DP at the initial height has been completed, the control unit 400 may transmit a command to lift the measuring unit 100 to the driving unit 200. Depending on setting of the control unit 400, the measuring unit 100 may be lifted to a certain height, for example, about 1 mm to about 20 mm, in an upward direction, but the lifting width of the measuring unit 100 is not limited thereto. Thus, as shown in FIG. 10, the measuring unit 100 is positioned higher from the floor of the shoe S. Thereafter, the control unit 400 may transmit a command to rotate the measuring unit 100 to the driving unit 200. The measuring unit 100 may acquire data points DP from a new layer while being rotated.

The height raising and rotation operation of the measuring unit 100 may be repeated several to several hundred times. That is, the measuring unit 100 may acquire the data points DP for every several to several hundreds of layers.

Referring to FIG. 11, when the height of the measuring unit 100 is sufficiently raised and all of the sensors 110F and 110B are positioned higher than the top end of the shoe S, the sensors 110F and 110B may not acquire data points from the shoe inner surface S_IS. In this case, the control unit 400 may determine that the measuring unit 100 has come out of the shoe S and may terminate sensing of the sensor 110 without further raising the height of the measuring unit 100.

Figure 12:
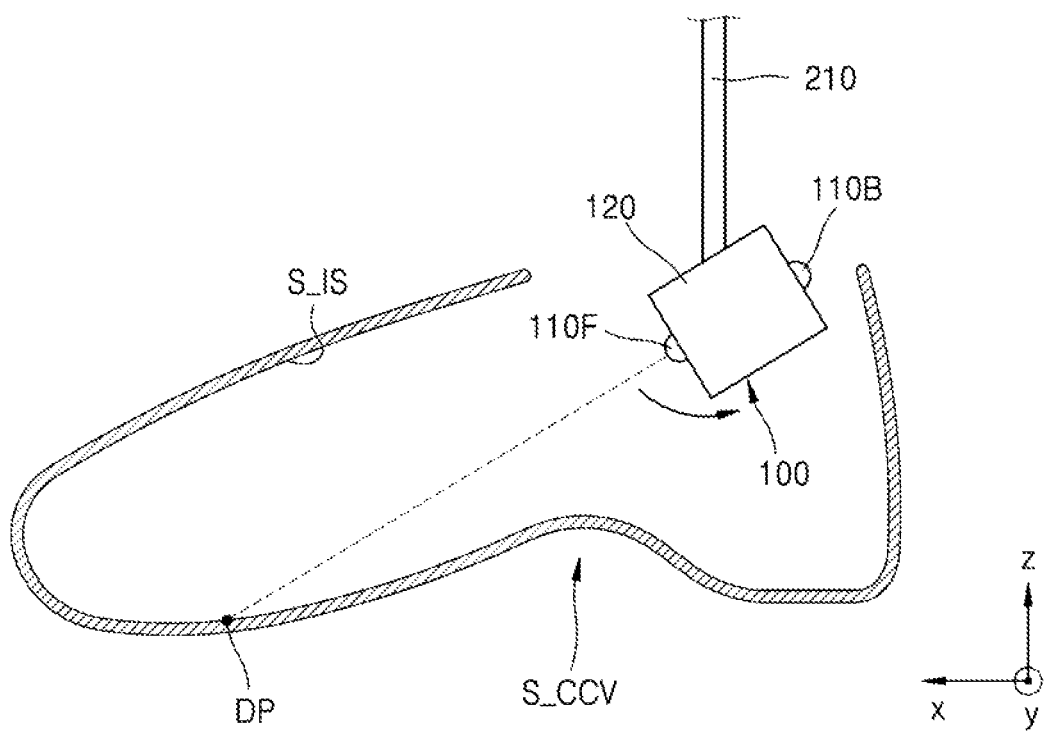
FIG. 12 is a diagram conceptually illustrating an operating method of a measuring unit according to an embodiment.

FIG. 12 is a diagram conceptually illustrating an operating method of a measuring unit according to an embodiment. Referring to FIG. 12, similarly to FIG. 6, a shoe having a concave portion S_CCV is shown. The measuring unit 100 may make a pitching motion with respect to the connection portion 210 of the driving unit 200. That is, the measuring unit 100 may be rotated around the y-axis. When the measuring unit 100 makes a pitching motion, the measuring unit 100 may acquire data points DP from the entire of the inner surface S_IS of the shoe S having the concave portion S_CCV.

Figure 13:
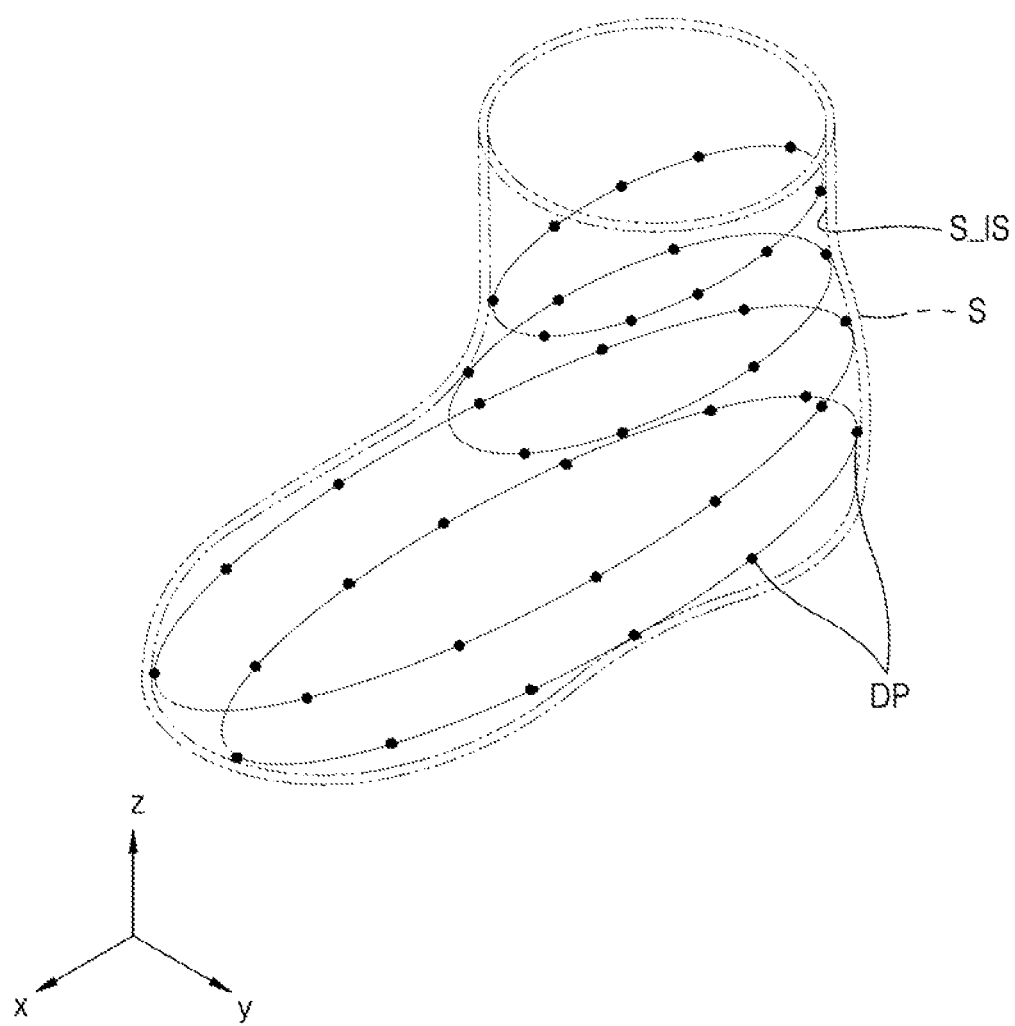
FIG. 13 is a diagram schematically illustrating a three-dimensional structure of a shoe inner surface generated by a control unit.

FIG. 13 is a diagram schematically illustrating a three-dimensional (3D) structure of the shoe inner surface S_IS generated by the control unit 400. The control unit 400 may process the data points DP acquired by the sensor 110 to calculate the 3D structure of the shoe inner surface S_IS. The control unit 400 may calculate a 3D image by 3D rending the data points.

The control unit 400 may calculate various numerical information related to the shoe by analyzing the 3D structure of the shoe inner surface S_IS. For example, the control unit 400 may calculate various information such as the width and length of the shoe, the height from the floor of the shoe to a part touching the instep of the foot, the degree of curvature of the floor, and the width of the shoe entrance. The control unit 400 may store the shoe information described above or may transmit the shoe information to a separate database DB or server. The numerical information may be used to find customized shoes that fit the shape of the user's foot.

Figure 14:
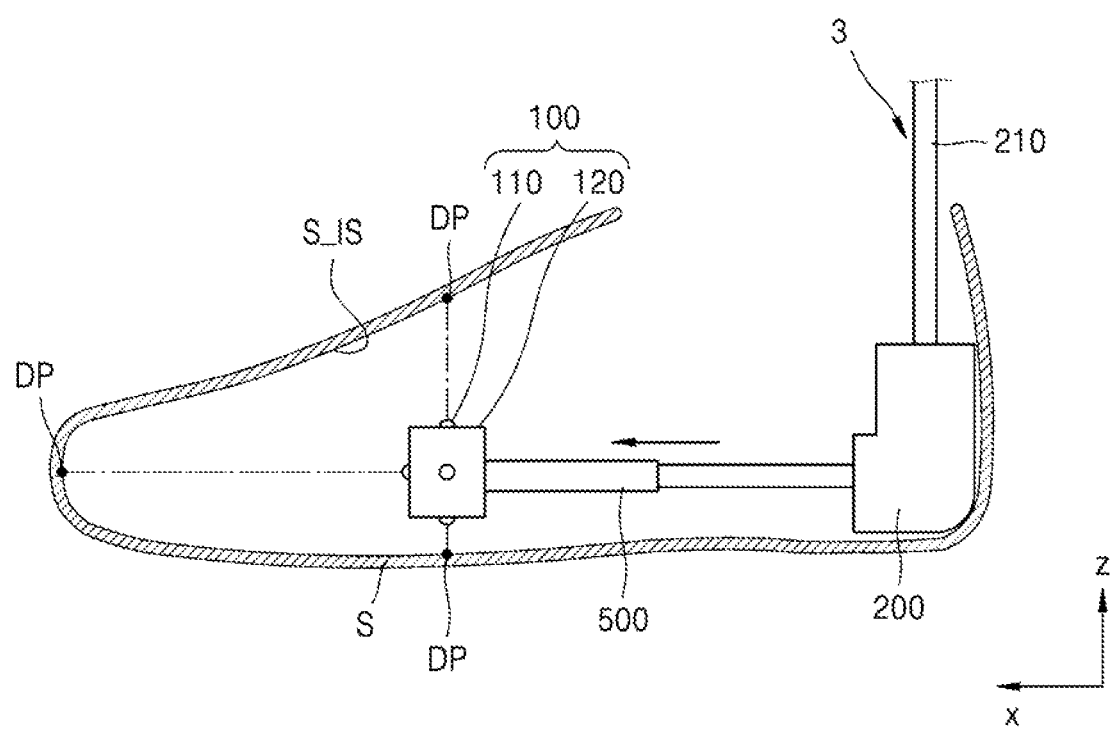
FIGS. 14 and 15 are diagrams illustrating a state in which a device for measuring the inner size of a shoe according to another embodiment of the present disclosure is inserted into the shoe, as viewed from the left and above.
Figure 15:
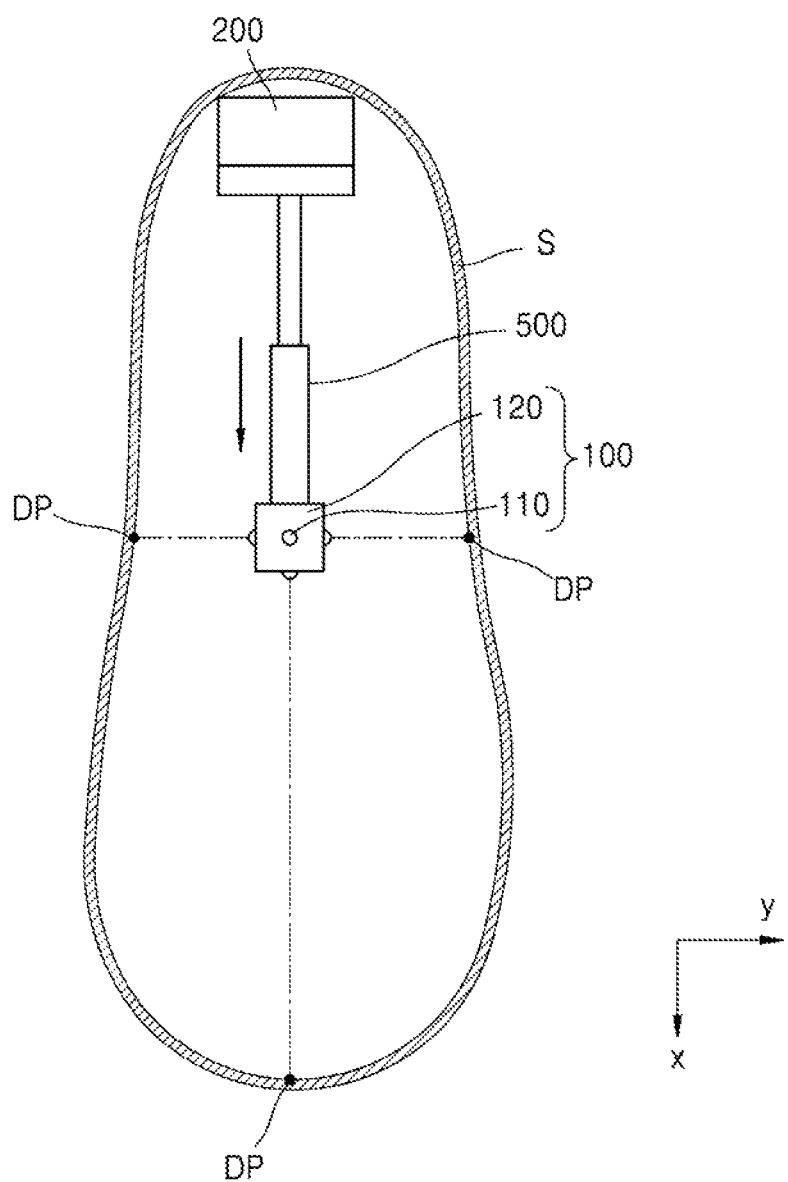

FIGS. 14 and 15 are diagrams illustrating a state in which a device 3 for measuring the inner size of a shoe according to another embodiment of the present disclosure is inserted into the shoe S, as viewed from the left and above.

The device 3 for measuring the inner size of the shoe according to another embodiment may include a driving unit 200, a length adjustment unit 500, and a measuring unit 100.

Referring to FIG. 14, the driving unit 200 may be inserted into the back of the inside of the shoe S. The driving unit 200 may be arranged in close contact with the floor of the shoe S. The driving unit 200 may be connected to an external component via the connection portion 210.

The length adjustment unit 500 may be connected to the driving unit 200 and may have the shape of a stick that is elongated in the front and rear directions of the shoe S. The length of the length adjustment unit 500 may be adjusted by the driving unit 200. In a state in which the length of the length adjustment unit 500 is decreased, the driving unit 200 and the length adjustment unit 500 may be inserted into the shoe S. Thereafter, when the driving unit 200 is seated at the back of the shoe S, the length of the length adjustment unit 500 may be increased. The length of the length adjustment unit 500 may be adjusted and measured by the driving unit 200.

The measurement unit 100 may be moved along the length adjustment unit 500 in the front and rear directions of the shoe S. The measurement unit 100 may be combined with an end of the length adjustment unit 500. The measurement unit 100 may include a sensor 110, and a substrate 120 to which the sensor 110 is connected. The sensor 110 may measure a distance up to one point of the shoe inner surface S_IS in a non-contact manner.

The measuring unit 100 may include a plurality of sensors 110. The plurality of sensors 110 may be arranged in various places such as the front, top, bottom, left and right of the substrate 120. For example, when the data points DP acquired through the sensor 110 located in front of the substrate 120 are used, the 'length' information of the shoe may be acquired. The control unit 400 may receive distance information up to the data point DP acquired by the front sensor 110 and length information in which the length adjustment unit 500 is elongated, thereby calculating the length of the shoe S in the front and rear directions. In addition, when the data points DP acquired through the sensor 110 located at the left and right of the substrate 120 are used, 'the width of feet' information of the shoe S may be acquired. Also, when the data points DP acquired through the sensor 110 located at the top and bottom of the substrate 120 are used, the 'height of the instep of the foot' information of the shoe S may be acquired.

Whenever the position of the measuring unit 100 is changed due to the change in the length of the length adjustment unit 500, the sensor 110 may acquire the data points DP. Optionally, the measuring unit 100 may be rotated using a direction (x-direction) in which the length adjustment unit 500 is elongated, as a rotation axis. A mechanism in which the measuring unit 100 makes a reciprocating motion and rotation motion to acquire the data points DP, is similar to the above-described embodiment and thus, a detailed description thereof will be omitted.

Figure 16:
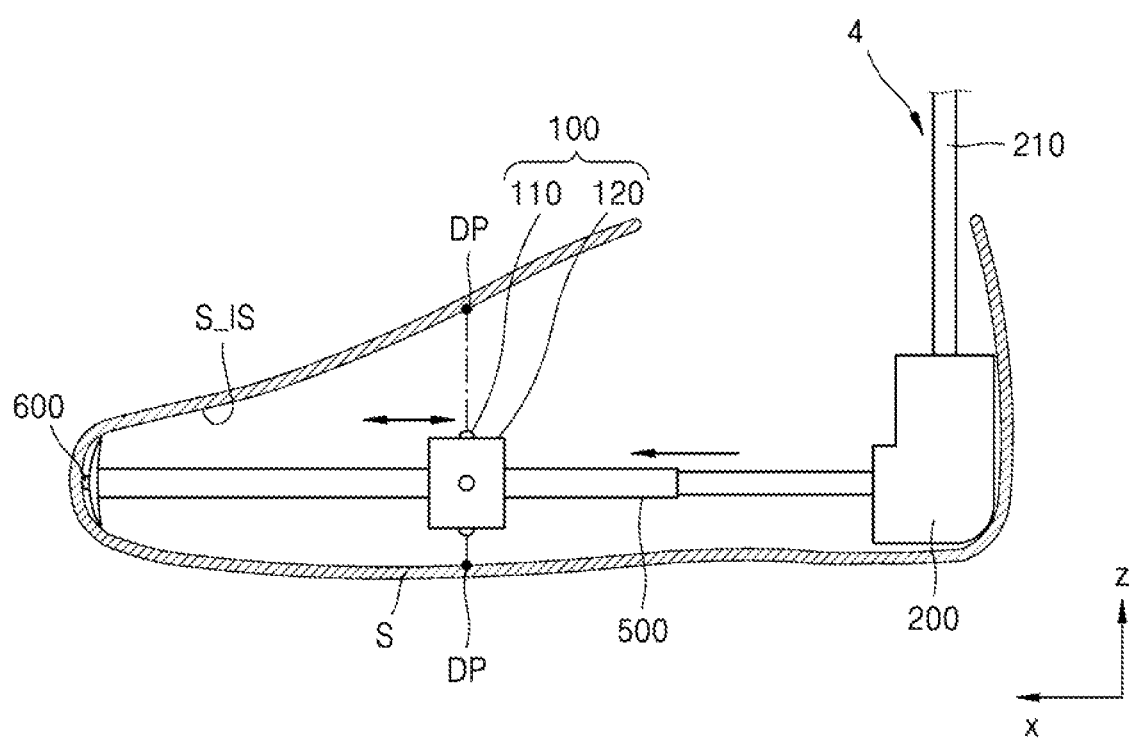
FIGS. 16 and 17 are diagrams illustrating a state in which a device for measuring the inner size of a shoe according to another embodiment of the present disclosure is inserted into the shoe, as viewed from the left and above.
Figure 17:
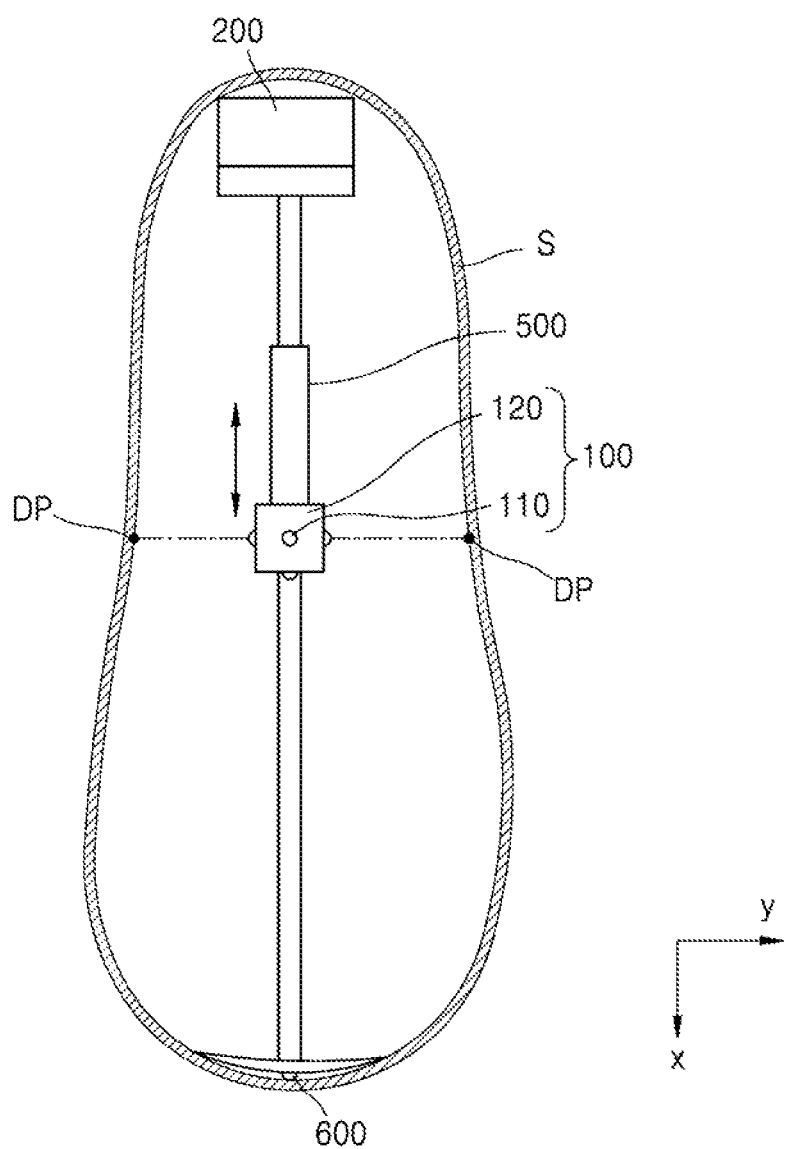

FIGS. 16 and 17 are diagrams illustrating a state in which a device 4 for measuring the inner size of a shoe S according to another embodiment of the present disclosure is inserted into the shoe S, as viewed from the left and above.

According to an embodiment, a contact sensor 600 may be installed at the front end of the length adjustment unit 500. When the length of the length adjustment unit 500 is increased and a contact signal is sensed by the contact sensor 600, the control unit 400 may determine that the length adjustment unit 500 comes in contact with the inner surface S_IS of the front of the shoe. In this case, the length adjustment unit 500 may not be elongated. The control unit 400 may calculate the length of the shoe S in the front and rear directions by receiving length information at a point in time at which the length adjustment unit 500 stops.

According to an embodiment, the measuring unit 100 may be penetrated by the length adjustment unit 500. The measuring unit 100 may reciprocate along a direction (x-direction) in which the length adjustment unit 500 is elongated. That is, apart from that the length of the length adjustment unit 500 is adjusted, the measuring unit 100 may be moved relative to the length adjustment unit 500. When the front end of the length adjustment unit 500 contacts the shoe inner surface S_IS and the position of the measuring unit 100 is fixed, the measuring unit 100 may acquire the data points DP while making a reciprocating motion and/or rotation motion. A detailed mechanism thereof is similar to the above-described embodiment and thus, a detailed description thereof will be omitted.

Figure 18:
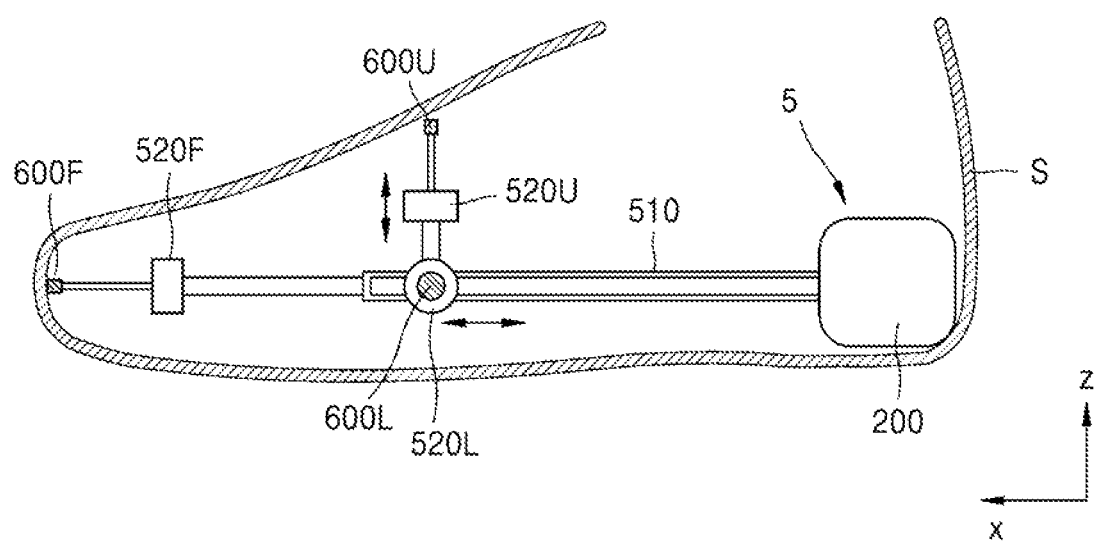
FIGS. 18 and 19 are diagrams illustrating a state in which a device for measuring the inner size of a shoe according to another embodiment of the present disclosure is inserted into the shoe, as viewed from the left and above.
Figure 19:
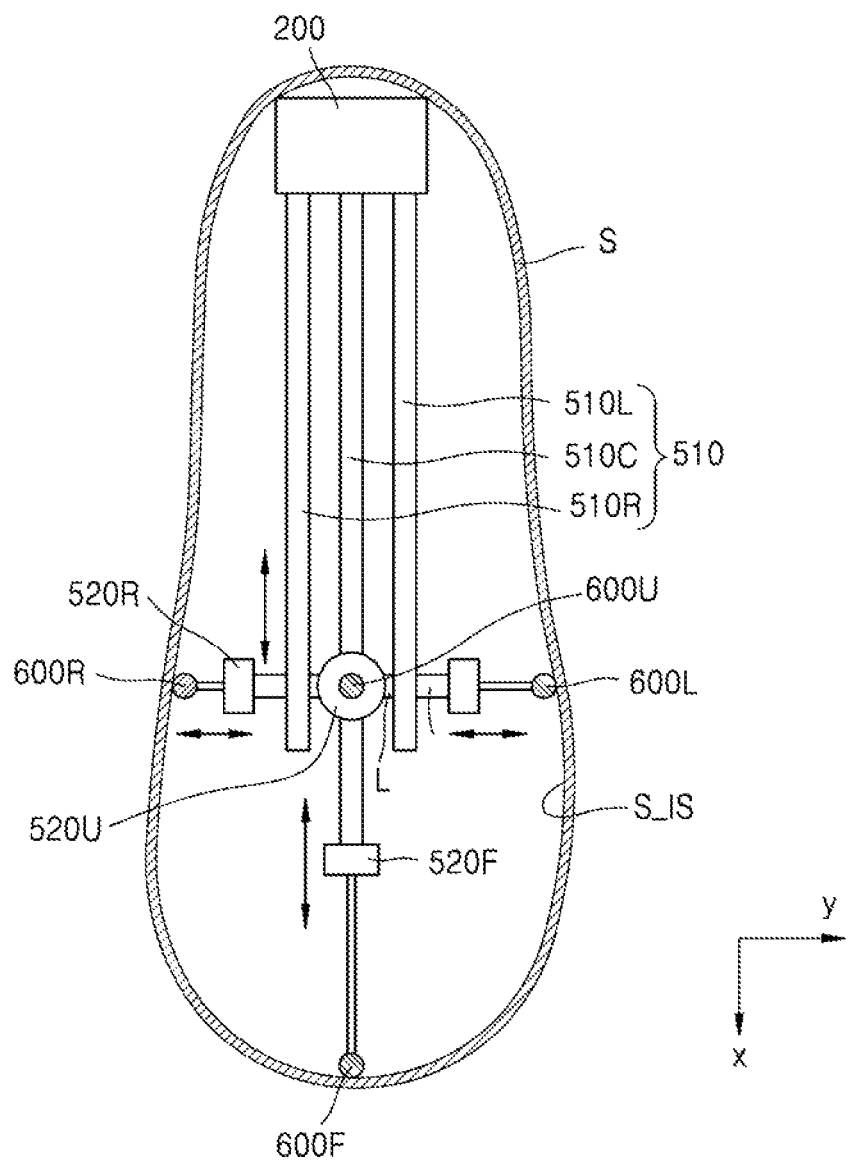

FIGS. 18 and 19 are diagrams illustrating a state in which a device 5 for measuring the inner size of a shoe S according to another embodiment of the present disclosure is inserted into the shoe S, as viewed from the left and above.

According to an embodiment, the length adjustment unit 500 may include a fixing shaft 510, and a movement unit 520 that moves along the fixing shaft 510. The fixing shaft 510 may include a central fixing shaft 510C, a left fixing shaft 510L, and a right fixing shaft 510R. The movement unit 520 may include a front movement unit 520F that moves along the central fixing shaft 510C, the left fixing shaft 510L and the right fixing shaft 510R, a left movement unit 520L, and a right movement unit 520R.

Referring to FIGS. 17 and 18, the left movement unit 520L may move along the left fixing shaft 510L in the front and rear directions. In addition, the left movement unit 520L may also move in left and right directions. The right movement unit 520R may move along the right fixing shaft 510R in the front and rear directions. In addition, the right movement unit 520R may also move in the left and right directions. Each of contact sensors 600L and 600R may be connected to an end of each of the left movement unit 520L and the right movement unit 520R. When the left movement unit 520L and the right movement unit 520R move in the left and right directions, coordinates of the contact sensors 600L and 600R in the left and right directions may be changed. In addition, when the left movement unit 520L and the right movement unit 520R move in the front and rear directions, the coordinates of the contact sensors 600L and 600R in the left and right directions may be changed. The right movement unit 520R and the left movement unit 520L may be connected to each other by a link L and may move integrally. That is, the right movement unit 520R and the left movement unit 520L may move simultaneously in the front and rear directions. The driving unit 200 may change coordinates of the right movement unit 520R and the left movement unit 520L. In this case, when the contact sensors 600L and 600R come in contact with the shoe inner surface S_IS, the control unit 400 may receive coordinate signals of the left movement unit 520L and the right movement unit 520R to measure 'the width of feet' of the shoe.

In addition, an upper movement unit 520U may be arranged between the right movement unit 520R and the left movement unit 520L. The right movement unit 520R, the left movement unit 520L, and the upper movement unit 520U may be connected to one another by the link L and thus may move integrally. That is, the right movement unit 520R, the left movement unit 520L, and the upper movement unit 520U may move simultaneously in the front and rear directions. The upper movement unit 520U may move along the central fixing shaft 510C in the front and rear directions. In addition, the upper movement unit 520U may move in the up and down directions. The contact sensor 600U may be connected to one end of the upper movement unit 520U. When the upper movement unit 520U moves in the front and rear directions, the coordinates of the contact sensor 600U in the front and rear directions may be changed. In addition, when the upper movement unit 520U moves in the up and down directions, the coordinates of the contact sensor 600U in the up and down directions may be changed. The driving unit 200 may change the coordinates of the upper movement unit 520U. In this case, when the contact sensor 600U comes in contact with the shoe inner surface S_IS, the control unit 400 may receive coordinate signals of the upper movement unit 520U to measure the 'height of the instep' of the shoe.

The front movement unit 520F may be connected to one end of the central fixing shaft 510C. The front movement unit 520F may move separately from the right movement unit 520R, the left movement unit 520L, and the upper movement unit 520U. The front movement unit 520F may move along the central fixing shaft 510C in the front and rear directions. The contact sensor 600F may be connected to one end of the front movement unit 520F. When the front movement unit 520F moves in the front and rear directions, the coordinates of the contact sensor 600F in the front and rear directions may be changed. The driving unit 200 may change the coordinates of the front movement unit 520F. In this case, when the contact sensor 600F comes in contact with the shoe inner surface S_IS, the control unit 400 may receive coordinate signals of the front movement unit 520F to measure the 'height of the instep of the foot' of the shoe.

In the embodiment of FIGS. 18 and 19, the size information of the shoe inner surface S_IS, in particular, three-axis information such as 'length', 'the width of feet', and 'the height of the instep of the foot', may be measured using the 'contact sensor 600' in a contact manner.

Figure 20:
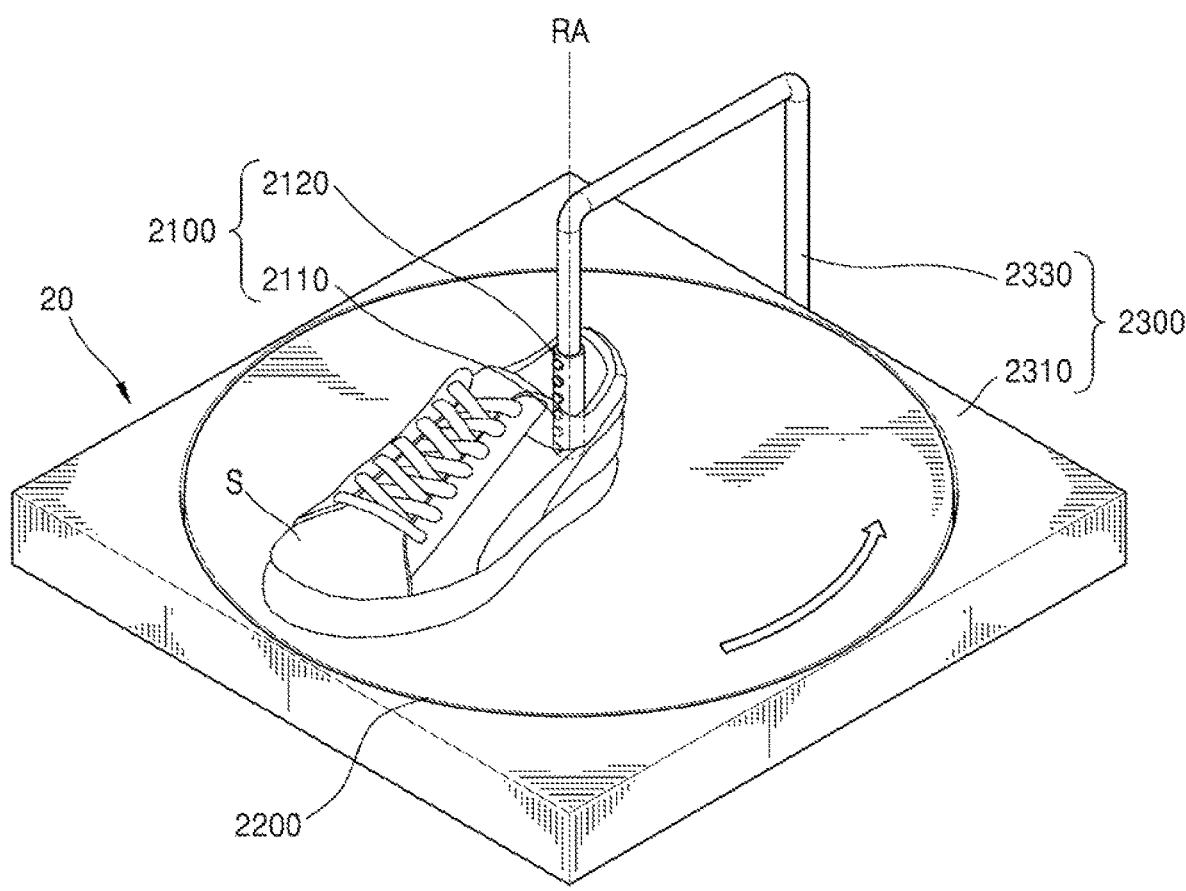
FIG. 20 is a perspective view schematically illustrating a device for measuring the inner size of a shoe according to another embodiment of the present disclosure.

FIG. 20 is a perspective view schematically illustrating a device 20 for measuring the inner size of a shoe according to another embodiment of the present disclosure. The device 20 for measuring the inner size of the shoe according to an embodiment of the present disclosure may include a rotation unit 2200, a measuring unit 2100, and a frame 2300.

The rotation unit 2200 may rotate the shoe S around a preset rotation axis RA. For example, the rotation unit 2200 may rotate by itself, and the shoe S placed on the upper surface of the rotation unit 2200 may be rotated around the rotation axis RA simultaneously with the rotation unit 2200. The rotation unit 2200 may have a shape of a plate for supporting the shoe S. The rotation unit 2200 may have a shape of a circular turntable, as illustrated in FIG. 20, but embodiments are not limited thereto.

The measuring unit 2100 may include a sensor 2110, and a substrate 2120 to which the sensor 2120 is connected. The measuring unit 2100 may be inserted into the shoe S. The center of the measuring unit 2100 may be placed on the rotation axis RA.

Unlike the measuring unit 100 that is rotated by the driving unit 200 by itself, of the measuring devices 1 and 2 of FIGS. 1 and 7, the measuring unit 2100 of the measuring device 20 may be still with respect to the ground or a frame 2300, and the shoe S may be rotated. However, only the rotation subject has changed, and the measuring unit and the shoe may be relatively rotated in both the measuring devices 1 and 2 of FIGS. 1 and 7 and the measuring device 20 of FIG. 20. Thus, the arrangement of the sensors described in FIGS. 1 through 13, the principle of operation in which the sensor rotates relative to the shoe at a certain angle to acquire data points, and the principle in which the sensor calculates contour data from a layer with a different layer while moving in the z-axis direction by the z-axis movement unit, may be similarly applied to the embodiment of the measuring device 20 of FIG. 20. When the shoe S is rotated with respect to the measuring unit 2100, a component for rotating the measuring unit 2100 is omittable and thus, the mechanical configuration of the measuring unit 2100 may be simplified.

The frame 2300 may include a support portion 2310 and a connection portion 2330. The support portion 2310 may support the rotation unit 2200. That is, the rotation unit 2200 and the shoe S placed on the upper surface of the rotation unit 2200 may be rotated with respect to the support portion 2310. The connection portion 2330 may connect the measuring unit 2100 to the support portion 2310. The measuring unit 2100 may be fixed by the connection portion 2330 in place. FIG. 20 illustrates that the connection portion 2330 connects the measuring unit 2100 to the support portion 2310 in a 'ㄷ'-shape. However, embodiments are not limited thereto.

A control unit (not shown) may drive the rotation unit 2200 in a wired/wireless manner and may transmit and receive a signal to and from the measuring unit 2100. The control unit may control on/off and operations of the rotation unit 2200 and the sensor 2110. For example, the control unit may rotate a stepper motor or servo motor connected to the rotation unit 220 to rotate the rotation unit 2200 relative to the frame 2300.

By using a device for measuring the inner size of a shoe according to an embodiment of the present disclosure, three-dimensional (3D) structure information of the inner surface of the shoe or important dimension information of a shoe such as 'length,' 'the width of feet,' and 'the height of the instep of the foot' can be automatically acquired. In particular, since the device of the present disclosure can accurately and quickly acquire dimension information of the 'inner surface' rather than the 'outer surface' of the shoe, it can be usefully used to find customized shoes that fit the shape of a user's foot.

According to the present disclosure, a device for measuring the inner size of a shoe is provided. In addition, embodiments of the present disclosure may be applied to an industrially used apparatus for measuring the inner size of an object in which an inner space is formed.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A device for measuring an inner size of a shoe, comprising:
    a driving unit including a motor and configured to be inserted into the shoe;
    a length adjustment unit having a length capable of being adjusted by the driving unit and having a shape of a stick that is elongated in front and rear directions of the shoe;
    a measuring unit capable of moving along the length adjustment unit in the front and rear directions of the shoe and having a sensor for measuring a distance up to an inner surface in a vertical direction of the shoe, and
    a contact sensor installed at a front end of the length adjustment unit,
    wherein the measuring unit is penetrated by the length adjustment unit.

2. The device of claim 1, further comprising a control unit configured to control the length adjustment unit and to calculate a length of the shoe in the front and rear directions.

3. The device of claim 2, wherein the control unit is configured to determine that the length adjustment unit comes in contact with the inner surface of the front of the shoe and calculate the length of the shoe in the front and rear directions by receiving length information at a point in time at which the length adjustment unit stops.

4. The device of claim 1, wherein the driving unit is configured to be inserted into a back of the inside of the shoe.

5. The device of claim 1, wherein the sensor comprises a first sensor being capable of measuring the distance up to an inner surface of the shoe in a non-contact manner.

6. The device of claim 1, wherein the length adjustment unit comprises:
    a fixing shaft elongated from the driving unit; and
    a movement unit inserted into the fixing shaft and being configured to be movable along the fixing shaft in a front and rear direction.

7. The device of claim 6, wherein the contact sensor is installed at the moving unit.

8. A device for measuring an inner size of a shoe, comprising:
    a driving unit including a motor and configured to be inserted into the shoe;
    a length adjustment unit having a length capable of being adjusted by the driving unit and being elongated in front and rear directions of the shoe;
    a measuring unit having a sensor for measuring a distance up to an inner surface in a vertical direction of the shoe;
    a control unit configured to control the length adjustment unit; and
    a contact sensor installed at a front end of the length adjustment unit,
    wherein the measuring unit is penetrated by the length adjustment unit.

9. The device of claim 8, wherein the control unit is configured to determine that the length adjustment unit comes in contact with the inner surface of the front of the shoe and calculate the length of the shoe in the front and rear directions by receiving length information at a point in time at which the length adjustment unit stops.

10. The device of claim 8, wherein the driving unit is configured to be inserted into a back of the inside of the shoe.

11. The device of claim 8, wherein the sensor comprises a first sensor being capable of measuring the distance up to an inner surface of the shoe in a non-contact manner.

12. The device of claim 8, wherein the length adjustment unit comprises:
- a fixing shaft elongated from the driving unit; and
- a movement unit inserted into the fixing shaft and being configured to be movable along the fixing shaft in a front and rear direction.

13. The device of claim 12, wherein the contact sensor is installed at the moving unit.

* * * * *